(12) United States Patent
Kwon et al.

(10) Patent No.: US 9,634,325 B2
(45) Date of Patent: Apr. 25, 2017

(54) NEGATIVE ACTIVE MATERIAL, NEGATIVE ELECTRODE AND LITHIUM BATTERY INCLUDING THE NEGATIVE ACTIVE MATERIAL, AND METHOD OF MANUFACTURING THE NEGATIVE ACTIVE MATERIAL

(71) Applicant: SAMSUNG SDI CO., LTD., Yongin-si, Gyeonggi-do (KR)

(72) Inventors: Seung-Uk Kwon, Yongin-si (KR); Jae-Hyuk Kim, Yongin-si (KR); Soon-Sung Suh, Yongin-si (KR); Hee-Young Chu, Yongin-si (KR); Chang-Ui Jeong, Yongin-si (KR); Yo-Han Park, Yongin-si (KR); Yury Matulevich, Yongin-si (KR); Chun-Gyoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 227 days.

(21) Appl. No.: 14/555,489

(22) Filed: Nov. 26, 2014

(65) Prior Publication Data
US 2015/0214544 A1  Jul. 30, 2015

(30) Foreign Application Priority Data

Jan. 27, 2014  (KR) .................. 10-2014-0009937

(51) Int. Cl.
*H01M 4/38* (2006.01)
*H01M 4/04* (2006.01)
(Continued)

(52) U.S. Cl.
CPC ............... *H01M 4/386* (2013.01); *B22F 9/04* (2013.01); *C22C 1/00* (2013.01); *H01M 4/0404* (2013.01);
(Continued)

(58) Field of Classification Search
None
See application file for complete search history.

(56) References Cited

U.S. PATENT DOCUMENTS 6,544,687 B1   4/2003   Sato et al.
2004/0258993 A1  12/2004   Matsuno et al.
(Continued)

FOREIGN PATENT DOCUMENTS

EP   0 750 050 A1   12/1996
EP   1 033 767 A1    9/2000
(Continued)

OTHER PUBLICATIONS

English machine translation of Japanese Publication No. JP 06-325764, dated Nov. 25, 1994, 9 pages.
(Continued)

*Primary Examiner* — Scott J Chmielecki
(74) *Attorney, Agent, or Firm* — Lewis Roca Rothgerber Christie LLP

(57) ABSTRACT

A negative active material, a negative electrode, a lithium battery including the negative active material, and a method of manufacturing the negative active material, the negative electrode, and the lithium battery. The negative active material includes a silicon-based alloy including Si, Ti, Ni, and Fe components. The silicon-based alloy includes a $Ti_2Ni$ phase as an inactive phase and active silicon having a lower content than that of typical silicon-based alloys. The negative active material may improve discharge capacity and lifetime characteristics of lithium batteries.

20 Claims, 7 Drawing Sheets

(51) Int. Cl.
*H01M 4/62* (2006.01)
*H01M 10/052* (2010.01)
*B22F 9/04* (2006.01)
*C22C 1/00* (2006.01)
*H01M 4/02* (2006.01)

(52) U.S. Cl.
CPC ....... *H01M 4/0483* (2013.01); *H01M 4/0485* (2013.01); *H01M 4/0488* (2013.01); *H01M 4/622* (2013.01); *H01M 10/052* (2013.01); *H01M 2004/027* (2013.01); *Y02P 70/54* (2015.11); *Y02T 10/7011* (2013.01)

(56) References Cited

U.S. PATENT DOCUMENTS

| | | | |
|---|---|---|---|
| 2005/0095503 A1 | 5/2005 | Adachi et al. | |
| 2006/0102472 A1 | 5/2006 | Bito et al. | |
| 2007/0111100 A1* | 5/2007 | Bito | C22C 9/10 |
| | | | 429/231.95 |
| 2013/0130101 A1 | 5/2013 | Kim et al. | |
| 2013/0266865 A1* | 10/2013 | Kwon | H01M 4/386 |
| | | | 429/220 |
| 2014/0023928 A1* | 1/2014 | Jeon | H01M 4/364 |
| | | | 429/220 |

FOREIGN PATENT DOCUMENTS

| | | |
|---|---|---|
| EP | 2 648 249 A1 | 10/2013 |
| JP | 06-325764 | 11/1994 |
| JP | 2004-335439 | 11/2004 |
| JP | 2006-164960 | 6/2006 |
| JP | 2007-165300 | 6/2007 |
| JP | 2008-288214 | 11/2008 |
| KR | 2001-0072909 | 7/2001 |
| KR | 10-2005-0090220 | 9/2005 |
| KR | 10-2012-0012265 | 2/2012 |

OTHER PUBLICATIONS

EPO Search Report dated Aug. 7, 2015, for corresponding European Patent application 15152569.8, (5 pages).

* cited by examiner

NEGATIVE ACTIVE MATERIAL, NEGATIVE ELECTRODE AND LITHIUM BATTERY INCLUDING THE NEGATIVE ACTIVE MATERIAL, AND METHOD OF MANUFACTURING THE NEGATIVE ACTIVE MATERIAL

CROSS-REFERENCE TO RELATED APPLICATION

This application claims priority to and the benefit of Korean Patent Application No. 10-2014-0009937, filed on Jan. 27, 2014, in the Korean Intellectual Property Office, the entire content of which is incorporated herein by reference.

BACKGROUND

1. Field

One or more embodiments of the present invention relate to a negative active material, a negative electrode, a lithium battery including the negative active material, and a method of manufacturing the negative active material.

2. Description of the Related Art

Lithium secondary batteries generate electric energy by oxidation and reduction reactions occurring when lithium ions are intercalated into and deintercalated from both a positive electrode and a negative electrode (each including an active material that enables intercalation and deintercalation of lithium ions) with, e.g., an organic electrolytic solution or a polymer electrolytic solution between the positive electrode and the negative electrode.

By way of example, in a negative active material for lithium secondary batteries, a carbonaceous material such as artificial graphite, natural graphite, and hard carbon and a non-carbonaceous material such as Si and Sn, which enable intercalation or deintercalation of lithium ions may be used.

A non-carbonaceous material such as Si and Sn may have a high capacity, for example, a capacity that is about 10 times greater than that of graphite. However, due to a volumetric expansion during charging and discharging, capacity may be degraded. Despite previous research into various alloys and complexes, an improved negative active material for batteries is still desired.

SUMMARY

Aspects of embodiments of the present invention are directed toward a negative active material that is capable of improving discharge capacity and lifetime characteristics of a lithium battery including the same.

Aspects of embodiments are directed toward a negative electrode including the negative active material.

Aspects of embodiments are directed toward a lithium battery including the negative electrode.

Aspects of embodiments are directed toward a method of manufacturing the negative active material.

Additional aspects of embodiments of the present invention will be set forth in part in the description which follows and, in part, will be apparent from the description.

In an embodiment, a negative active material includes a silicon-based alloy including Si, Ti, Ni, and Fe components, in which the silicon-based alloy includes an inactive matrix including a $Ti_2Ni$ phase, and active silicon nanoparticles dispersed in the inactive matrix.

In one embodiment, an amount of the Fe component in the silicon-based alloy is about 7 at % to about 10 at % based on its atomic fraction in the silicon-based alloy.

In one embodiment, the silicon-based alloy includes about 50 at % to about 70 at % of the Si component, about 7 at % to about 10 at % of the Fe component, with the balance being equally split between an at % of Ti and an at % of Ni, based on each respective atomic fraction in the silicon-based alloy.

In one embodiment, the inactive matrix further includes a $Si_2TiFe$ phase and a $NiSi_2$ phase.

In one embodiment, the Si component includes inactive silicon and active silicon; the inactive matrix includes the inactive silicon; and the active silicon nanoparticles include the active silicon.

In one embodiment, the content of the active silicon nanoparticles in the silicon-based alloy is 36 at % or less based on its atomic fraction in the silicon-based alloy.

In one embodiment, the content of the active silicon nanoparticles in the silicon-based alloy is greater than 20 at % and to 36 at % or less, based on its atomic fraction in the silicon-based alloy.

In one embodiment, the active silicon nanoparticles have a particle diameter of about 10 nm to about 200 nm.

In one embodiment, the silicon-based alloy has an average particle diameter (D50) of about 0.3 μm to about 10 μm.

In another embodiment, a negative active material includes a silicon-based alloy, the silicon based alloy including Si, Ti, Ni, and Fe components, in which the silicon-based alloy includes an inactive matrix and active silicon nanoparticles dispersed in the inactive matrix. The active silicon nanoparticles in the silicon-based alloy is greater than 20 at % and to 36 at % or less, based on its atomic fraction in silicon-based alloy an and an amount of the Fe component is about 7 at % to about 10 at % based on its atomic fraction in silicon-based alloy.

In one embodiment, the silicon-based alloy includes about 50 at % to about 70 at % of the Si component, about 7 at % to about 10 at % of the Fe component, with the balance being equally split between an at % of Ti and an at % of Ni, based on each respective atomic fraction in the silicon-based alloy.

In one embodiment, the inactive matrix includes a $Si_2TiFe$ phase, a $Ti_2Ni$ phase, and a $NiSi_2$ phase.

In one embodiment, the active silicon nanoparticles have a particle diameter of about 10 nm to about 200 nm.

In one embodiment, the silicon-based alloy has an average particle diameter (D50) of about 0.3 μm to about 10 μm.

In a further embodiment, a negative electrode includes the negative active material.

In a further embodiment, a lithium battery includes the negative electrode.

In a further embodiment, a method of manufacturing a negative active material includes preparing a mother alloy, the mother alloy including about 50 at % to about 70 at % of Si, about 7 at % to about 10 at % of Fe, with the balance being equally split between the at % of Ti and the at % of Ni, based on a total of the atomic fractions of Si, Fe, Ti, and Ni at 100 at %, to prepare a silicon-based alloy; rapidly solidifying melts of the mother alloy to obtain a rapidly solidified alloy; and pulverizing the rapidly solidified alloy.

In one embodiment, the rapidly solidifying the melts of the mother alloy is performed by utilizing melt spinning, gas atomizing, or strip casting.

In one embodiment, the rapidly solidifying the melts of the mother alloy includes quenching the melts of the mother alloy at a rate of about 103 K/sec to about 107 K/sec.

In one embodiment, the rapidly solidified alloy is pulverized into powder having a D50 of about 0.3 μm to about 10 μm.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
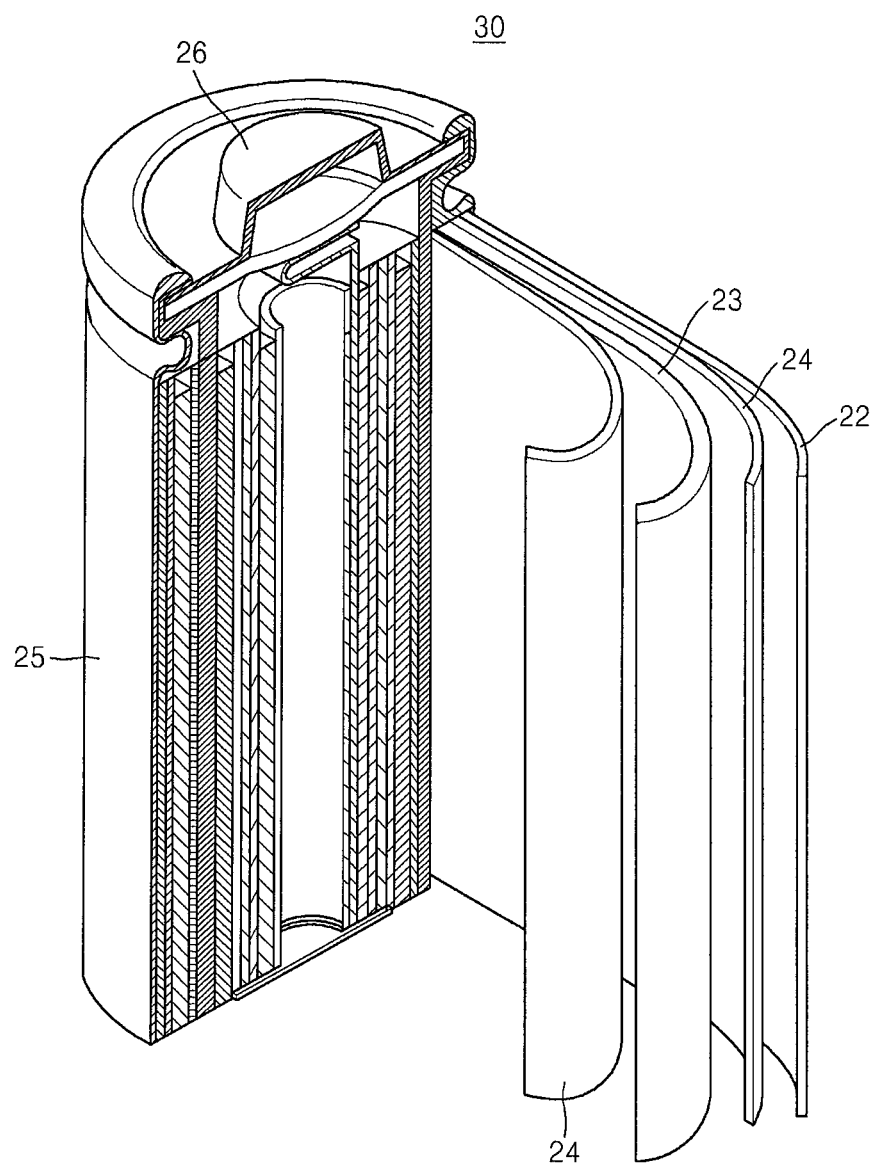
FIG. 1 is a schematic diagram of a cross-section of a lithium battery according to an embodiment.
Figure 2:
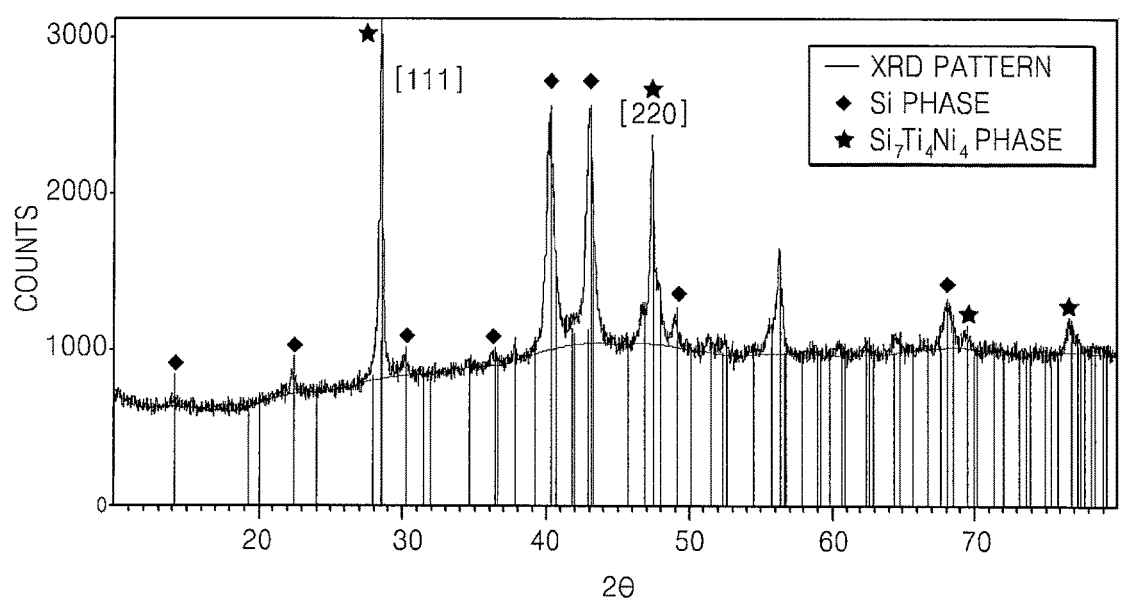
FIG. 2 is a graph illustrating XRD analysis results of a silicon-based alloy powder prepared according to Comparative Example 1.
Figure 3:
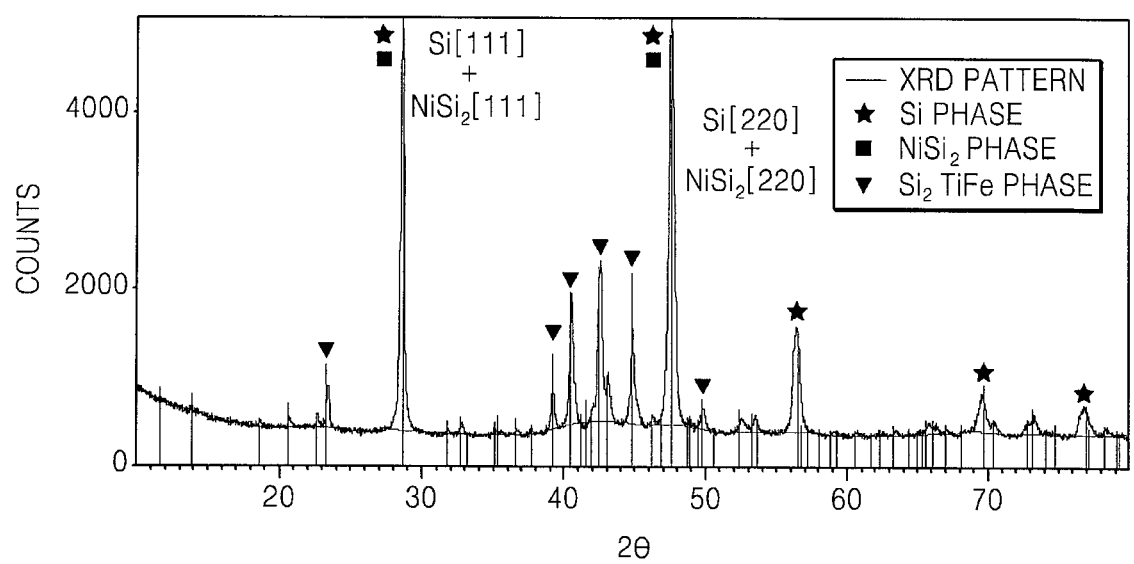
FIG. 3 is a graph illustrating XRD analysis results of a silicon-based alloy powder prepared according to Example 1.
Figure 4:
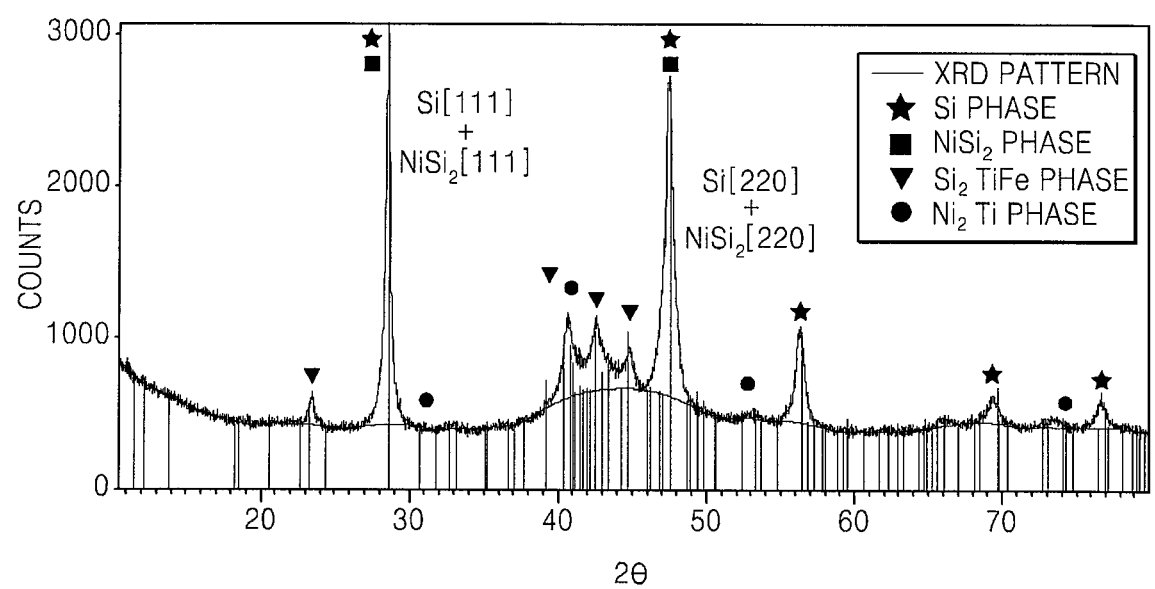
FIG. 4 is a graph illustrating XRD analysis results of a silicon-based alloy powder prepared according to Example 2.
Figure 5:
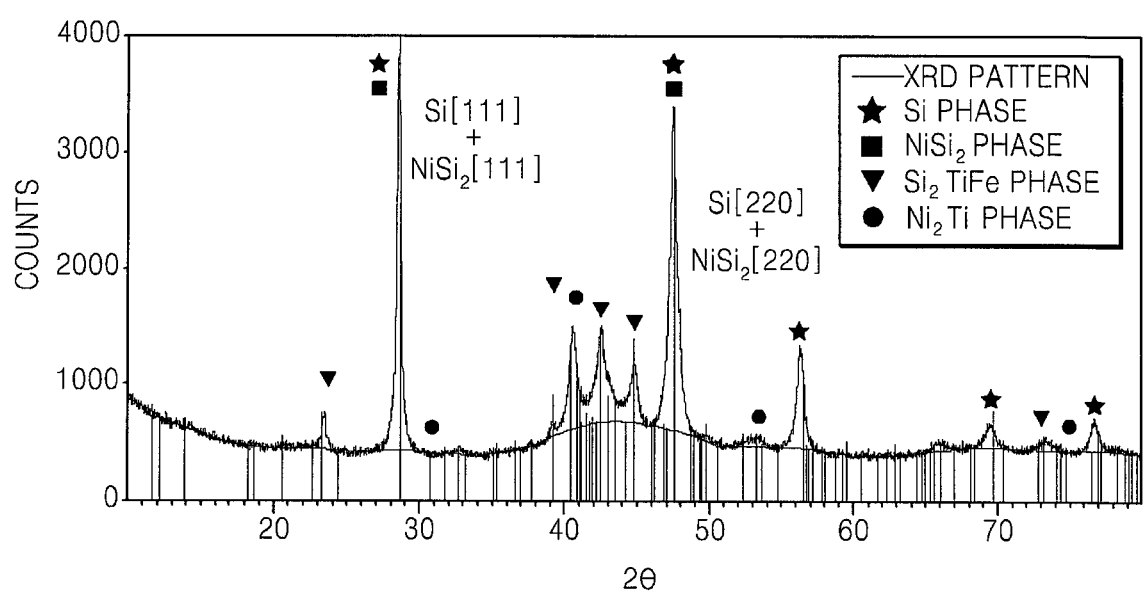
FIG. 5 is a graph illustrating XRD analysis results of a silicon-based alloy powder prepared according to Example 3.

In the following detailed description, only certain embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Further, the use of "may" when describing embodiments of the present invention refers to "one or more embodiments of the present invention". Expressions such as "at least one of," when preceding a list of elements, modify the entire list of elements and do not modify the individual elements of the list. Like reference numerals designate like elements throughout the specification.

A negative active material according to an embodiment includes a silicon-based alloy including Si and Ti, Ni, and/or Fe as components. In embodiments, the silicon-based alloy includes an inactive matrix including a $Ti_2Ni$ phase and active silicon nanoparticles dispersed in the inactive matrix.

The silicon-based alloy may be a quaternary alloy including Si, Ti, Ni, and Fe. According to an embodiment, the inactive matrix may include an alloy having a $Si_2TiFe$ phase, a $Ti_2Ni$ phase, and a $NiSi_2$ phase.

According to embodiments, the Si component included in the silicon-based alloy includes inactive silicon and active silicon. In an embodiment, the amount of active silicon may be correlated to the capacity of the silicon-based alloy as the active silicon is involved in reversible reaction with lithium ions. In an embodiment, the inactive silicon forms an inactive matrix which is not involved in a reaction with lithium ions. In some embodiments, the inactive matrix inhibits and/or reduces volumetric expansion of the silicon-based alloy. The active silicon may be dispersed in the inactive matrix. For example, the active silicon may be dispersed throughout the inactive matrix as precipitated nanoparticles. Thus, in the silicon-based alloy according to some embodiments, the inactive matrix includes inactive silicon, and the active silicon nanoparticles include active silicon.

According to an embodiment, in the silicon-based alloy, the content of the active silicon nanoparticles including the active silicon may be 36 at % or less (i.e., 36 at % or less as calculated based on its atomic fraction in the silicon-based alloy). According to embodiments, the content of the active silicon nanoparticles is less than that of active silicon contained in typical silicon-based alloys. Although a smaller content of the active silicon is used, almost all of the active silicon may be available for use in reversible reaction with Li. Thus, discharge capacity and lifetime characteristics may be improved.

In general, as the content of active silicon increases, discharge capacity increases. However, when the content of the active silicon is greater than a particular amount with respect to the inactive silicon, a ratio of the active silicon that is not substantially involved in discharge capacity increases. Since the negative active material according to the embodiments of the present invention further includes an Fe component in addition to Si, Ti, and Ni components, silicon not substantially involved in discharge capacity is formed in a silicide form, i.e., in a $NiSi_2$ form in the inactive matrix. Thus, although the content of the active silicon is less than that contained in typical silicon-based alloys, discharge capacity may still be improved with respect to typical silicon-based alloys. In addition, when silicon that is not involved in reversible reaction with Li is formed as a silicide, a side reaction with an electrolyte may be prevented, and thus the strength of the inactive matrix may be improved.

According to an embodiment, the content of the active silicon nanoparticles in the silicon-based alloy may be greater than 20 at % and be 36 at % or less. Within this range, a lithium battery including the silicon-based alloy may have improved discharge capacity and lifetime characteristics.

However, an excess of silicide may reduce the content of the active silicon, and thus desired discharge capacity may be reduced. Thus, according to some embodiments, the $Ti_2Ni$ phase inhibits formation of an excess of silicide, so that the $NiSi_2$ phase may be formed in an amount suitable to reduce any loss in discharge capacity resulting from the formation of excess silicide. As the content of the $Ti_2Ni$ phase increases in the inactive matrix, the contents of the $Si_2TiFe$ phase and the $NiSi_2$ phase decrease, and accordingly the content of the active silicon nanoparticles may increase.

In this regard, the content of the $Ti_2Ni$ phase may be controlled by adjusting the content of the Fe component. According to embodiments, when the content of the Fe component increases, the content of the $Si_2TiFe$ phase increases, the content of $Ti_2Ni$ phase decreases, and the content of the $NiSi_2$ phase increases. As such, the increase in the Si component used as the inactive phase may result in decrease in the ratio of the active silicon. According to embodiments, when the content of the Fe component decreases, the content of the $Si_2TiFe$ phase decreases, the content of $Ti_2Ni$ phase increases, and the content of the $NiSi_2$ phase decreases. As such, the decrease in the Si component used as the inactive phase may result in increase in the ratio of the active silicon.

Accordingly, the active silicon nanoparticles having a desired content may be obtained by adjusting the atomic fraction of the Fe component in the silicon-based alloy. That is, the atomic fraction of the Fe component may be selected by considering the formation ratio of each phase. In some embodiments, the atomic fraction of the Fe component may be from about 7 at % to about 10 at %.

According to an embodiment, the silicon-based alloy may include about 50 at % to about 70 at % of the Si component, about 7 at % to about 10 at % of the Fe component, with the balance being equally split between at % of the Ti component and at % of the Ni component based on the atomic fraction of each metal component. According to some embodiments, in using the composition ratio as described above, discharge capacity and lifetime characteristics may be improved.

The active silicon nanoparticles may have a particle diameter of about 10 nm to about 200 nm. For example, the active silicon nanoparticles may have a particle diameter of about 10 nm to about 150 nm, or about 10 nm to about 100 nm.

The particle diameter of the active silicon nanoparticles may be calculated through Schemer's equation by using (utilizing) full width at half maximum for the Si(111) plane in an X-ray diffraction spectrum using (utilizing) CuK-alpha X-rays having a wavelength of 1.541 Å.

According to embodiments of the present invention, since the active silicon nanoparticles having the particle diameters described above are uniformly dispersed in the inactive matrix, volumetric expansion of the active silicon nanoparticles may be buffered by the inactive matrix surrounding the active silicon nanoparticles during charging and discharging cycles. That is, the inactive matrix may suppress volumetric expansion of the active silicon nanoparticles.

The silicon-based alloy may be pulverized into powder having an average diameter (D50) of about 0.3 μm to about 10 μm and used (utilized) in preparation of a negative electrode. D50 refers to a cumulative particle diameter at 50% of a total cumulative particle diameter distribution of particles from the smallest particle diameter. The D50 may be measured by using a commonly used (utilized) method, for example, using a particle size analyzer, or TEM or SEM images. Additionally, for example, the D50 may easily be obtained by measuring the particle size with a device using dynamic light-scattering, counting the number of particles within each particle size range by analyzing data, and calculating the D50.

The negative active material may include the silicon-based alloy alone or may include the silicon-based alloy together with any material commonly used to form the negative active material in lithium batteries.

Non-limiting examples of other materials used to form the negative active material include a carbonaceous material such as graphite and carbon, a lithium metal, a lithium alloy, a silicon oxide-based material, or a mixture thereof, which is capable of intercalation and deintercalation of lithium ions.

According to an embodiment, the negative active material includes a silicon-based alloy and a carbonaceous material. Non-limiting examples of the carbonaceous material include crystalline carbon such as natural graphite, artificial graphite, expanded graphite, graphene, carbon black, fullerene soot, carbon nanotubes, and carbon fibers, amorphous carbon such as soft carbon (cold calcined carbon), hard carbon, pitch carbide, mesophase pitch carbide, calcined cork, and combinations of two or more of the carbonaceous materials.

According to some embodiments, when the carbonaceous material is used together with the silicon-based alloy of the present disclosure, an oxidation reaction of the silicon-based alloy may be reduced, and formation of the SEI layer may be improved. For example, a more stable SEI layer may be formed, and the electrical conductivity may be improved. In some of these embodiments, the charging and discharging characteristics of lithium batteries may be further improved.

In embodiments where the carbonaceous material is used, the carbonaceous material may be mixed or blended with the silicon-based alloy, or coated on the surface of the silicon-based alloy. However, embodiments are not limited thereto.

The content of the material used to form the negative active material together with the silicon-based alloy may be from about 1 wt % to about 99 wt % based on the total content of the material used to form the negative active material and the silicon-based alloy.

In embodiments where the silicon-based alloy is a major component in the negative active material (i.e., in an amount exceeding the weight % of the other components based on the total content of the material used to form the negative active material and the silicon-based alloy), the content of the silicon-based alloy may be, for example, about 95 wt % to about 99 wt % based on the total content of the material used to form the negative active material and the silicon-based alloy. In embodiments where graphite or pitch, which is amorphous carbon, is used as the material used to form the negative active material, graphite or pitch may be coated on the surface of the silicon-based alloy.

In embodiments where the silicon-based alloy is a minor component in the negative active material (i.e., in an amount less than the weight % of the other components based on the total content of the material used to form the negative active material and the silicon-based alloy), the content of the silicon-based alloy may be, for example, in the range of about 1 wt % to about 5 wt % based on the total content of the material used to form the negative active material and the silicon-based alloy. In embodiments where graphite or pitch, which is amorphous carbon, is used as the material used to form the negative active material, graphite or pitch may function as a buffer of the silicon-based alloy, so that lifespan of the electrode may be improved.

Hereinafter, a method of manufacturing a negative active material including a silicon-based alloy will be described.

According to an embodiment, a method of manufacturing a negative active material includes: preparing a mother alloy including about 50 at % to about 70 at % of Si, about 7 at % to about 10 at % of Fe, with the balance being equally split between the at % of Ti and the at % of Ni, in which a total of the atomic fractions of Si, Fe, Ti, and Ni is 100 at %, to prepare a silicon-based alloy; rapidly solidifying melts of the mother alloy to obtain a rapidly solidified alloy; and pulverizing the rapidly solidified alloy.

The preparing of the mother alloy may be performed by vacuum induction melting (VIM), arc melting, or mechanical alloying. For example, the mother alloy may be prepared using (utilizing) vacuum induction melting in which the mother alloy is melted in a vacuum in order to inhibit oxidation caused by the air exposure. However, the method of preparing the mother alloy is not limited thereto, and any suitable method of preparing a mother alloy may also be used.

Starting materials used to form the silicon-based alloy include any materials suitable to obtain the desired composition ratio. For example, in order to mix elements included in the silicon-based alloy at a desired composition ratio, elements, alloys, solid solutions, compounds of metal, and/or the like may be used.

In some embodiments, in order to prepare the mother alloy including about 50 at % to about 70 at % of Si, about 7 at % to about 10 at % of Fe, with the balance being equally split between the at % of Ti and the at % of Ni, in which a total of the atomic fractions of Si, Fe, Ti, and Ni is 100 at %, metal powders of the elements are respectively weighted and mixed to a target composition ratio of the mother alloy, and then the mother alloy of the silicon-based alloy may be prepared using a vacuum induction melting furnace. The vacuum induction melting furnace is an apparatus capable of melting metal having a high melting point by using high frequency induction. In some embodiments, in the early stage of melting, the inside of the vacuum induction melting furnace is evacuated under reduced pressure and then backfilled with an inert gas such as argon (Ar) to inhibit or reduce oxidation of the prepared mother alloy.

Then, in some embodiments the mother alloy prepared as described above is melted and the melts are rapidly solidified. Non-limiting examples of the rapid solidifying process are melt spinning, gas atomizing, and strip casting. According to embodiments, through the rapid solidification process, the inactive phases of $Si_3Al_3Fe_2$ and $Si_2Fe$ may form a matrix, and thus an alloy in which the active phase of silicon nanoparticles is uniformly dispersed in the matrix may be prepared.

According to an embodiment, the rapid solidification process may be performed by melt spinning. For example, the melts of the mother alloy may rapidly be solidified while injection-molding the melts through a melt spinner using high frequency induction by a wheel rotating at a high speed. The melts of the mother alloy may rapidly be solidified at a rate of about $10^3$ K/sec to about $10^7$ K/sec.

According to embodiments, since the melts of the mother alloy are cooled by the wheel rotating at a high speed, the melts are injection-molded into a ribbon shape. The ribbon shape and the size of silicon nanoparticles dispersed in the alloy may vary according to a cooling speed. In order to obtain fine silicon nanoparticles, the cooling speed may be, for example, about 1000° C./s or higher. In addition, in order to obtain uniform silicon nanoparticles, the thickness of the injection-molded product having a ribbon shape may be adjusted to, for example, about 5 μm to about 20 μm. For example, the thickness of the ribbon may be from about 7 μm to about 16 μm.

The rapidly solidified alloy that is an injection-molded product having a ribbon shape may then be pulverized into a powder and used as a negative active material. The pulverized alloy powder may have a D50 of about 0.3 μm to about 10 μm. The pulverization may be performed by using any method that is commonly used for pulverizing solids. Non-limiting apparatuses used for pulverization include an atomizer, a vacuum mill, a ball mill, a planetary ball, a beads mill, a jet mill, and the like.

Pulverizations may be classified into dry pulverizations and wet pulverizations, both of which may be used herein.

A lithium battery according to another embodiment includes: a negative electrode including the negative active material, a positive electrode opposite to the negative electrode with an electrolyte therebetween.

The negative electrode includes the negative active material and may be manufactured, for example, by preparing a negative active material composition by mixing the negative active material, a binder, and optionally, a conductive agent in a solvent, and then molding the negative active material composition to a certain shape or coating the negative active material composition on a current collector, such as copper foil.

The binder used in the negative electrode active material composition facilitates binding of the negative electrode active material and the conductive agent, and binding with the current collector. The content of the binder may be about 1 to about 50 parts by weight based on 100 parts by weight of the negative active material. For example, the content of the binder may be about 1 to about 30 parts by weight, about 1 to about 20 parts by weight, or about 1 to about 15 parts by weight based on 100 parts by weight of the negative active material. Non-limiting examples of the binder include polyvinylidenefluoride, polyvinylidenechloride, polybenzimidazole, polyimide, polyvinylacetate, polyacrylonitrile, polyvinyl alcohol, carboxymethylcellulose (CMC), starch, hydroxypropylcellulose, regenerated cellulose, polyvinylpyrrolidone, tetrafluoroethylene, polyethylene, polypropylene, polystyrene, polymethylmethacrylate, polyaniline, acrylonitrilebutadienestyrene, phenol resin, epoxy resin, polyethyleneterephthalate, polytetrafluoroethylene, polyphenylsulfide, polyamideimide, polyetherimide, polyethylenesulfone, polyamide, polyacetal, polyphenyleneoxide, polybutylenetelephthalate, ethylene-propylene-diene terpolymer (EPDM), sulfonated EPDM, styrene butadiene rubber, a fluoride rubber, and various copolymers.

The negative electrode may further include a conductive agent in order to further improve electrical conductivity by providing a sufficient conductive passage to the negative active material. The conductive agent may be any conductive agent that can suitably be used in lithium batteries. Non-limiting examples of the conductive agent include a carbonaceous material such as carbon black, acetylene black, ketjen black, and carbon fiber (for example, a vapor phase growth carbon fiber); a metal such as copper, nickel, aluminum, and silver, each of which may be used in powder or fiber form; a conductive polymer such as a polyphenylene derivative; and any mixture thereof. As a non-limiting example, the conductive agent may be added in such a content that a weight ratio of the negative active material to the conductive agent is in the range of about 99:1 to about 90:10.

Non-limiting examples of the solvent include N-methylpyrrolidone (NMP), acetone, water, and the like. The content of the solvent may be about 1 to about 10 parts by weight based on 100 parts by weight of the negative active material. When the content of the solvent is included in these amounts, a process for forming the negative active material layer may more efficiently be performed.

The current collector is generally fabricated to have a thickness of about 3 to about 500 μm. The current collector may include any materials suitable to increase conductivity without (or substantially without) causing undesired chemical changes in the fabricated battery. Non-limiting examples of the current collector include copper, stainless steel, aluminum, nickel, titanium, calcined carbon, copper or stainless steel that is surface-treated with carbon, nickel, titanium or silver, and aluminum-cadmium alloys. In addition, the current collector may be processed to have fine irregularities on the surface thereof so as to enhance adhesive strength of the current collector to the negative active material, and may be used in any of various forms, non-limiting examples of which include films, sheets, foils, nets, porous structures, foams, and non-woven fabrics.

In one embodiment, the negative active material composition may directly be coated on the current collector to manufacture a negative electrode plate. In another embodiment, the negative electrode plate may be manufactured by casting the negative active material composition on a separate support to form a negative active material film, separating the negative active material film from the support, and laminating the negative active material film on a copper foil current collector. Fabrication of the negative electrode is not limited to the examples described above, and may also have various suitable shapes.

According to embodiments, the negative active material composition is not only used in the preparation of the electrode of lithium batteries, but also used in the preparation of a printable battery by being printed on a flexible electrode substrate.

To manufacture a positive electrode, a positive active material composition may be prepared by mixing a positive active material, a conductive agent, a binder, and a solvent.

Any lithium-containing metal oxide that can be suitably used in lithium batteries may be used as the positive active material.

For example, the positive active material may include one compound represented by one of the following formulae: $Li_aA_{1-b}B_bD_2$ (0.90≤a≤1.8 and 0≤b≤0.5); $Li_aE_{1-b}B_bO_{2-c}D_c$ (0.90≤a≤1.8, 0≤b≤0.5, and 0≤c≤0.05); $LiE_{2-b}B_bO_{4-c}D_c$ (0≤b≤0.5 and 0≤c≤0.05); $Li_aNi_{1-b-c}Co_bB_cD_\alpha$(0.90≤a≤1.8, 0≤b≤0.5, 0≤c≤0.05, and 0<α≤2); $Li_aNi_{1-b-c}Co_bB_cO_{2-\alpha}F_\alpha$ (0.90≤a≤1.8, 0≤b≤0.5, 0≤c≤0.05, and 0<α<2); $Li_aNi_{1-b-c}Co_bB_cO_{2-\alpha}F_2$ (0.90≤a≤1.8, 0≤b≤0.5, 0≤c≤0.05, and 0<α<2); $Li_aNi_{1-b-c}Mn_bB_cD_\alpha$(0.90≤a≤1.8, 0≤b≤0.5, 0≤c≤0.05, and 0<α≤2); $Li_aNi_{1-b-c}Mn_bB_cO_{2-\alpha}F_\alpha$(0.90≤a≤1.8, 0≤b≤0.5, 0≤c≤0.05, and 0<α<2); $Li_aNi_{1-b-c}Mn_bB_cO_{2-\alpha}F_2$ (0.90≤a≤1.8, 0≤b≤0.5, 0≤c≤0.05, and 0<α<2); $Li_aN-i_bE_cG_dO_2$ (0.90≤a≤1.8, 0≤b≤0.9, 0≤c≤0.5, and 0.001≤d≤0.1); $Li_aNi_bCo_cMn_dG_eO_2$ (0.90≤a≤1.8, 0≤b≤0.9, 0≤c≤0.5, 0≤d≤0.5, and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the formulae above, A is nickel (Ni), cobalt (Co), manganese (Mn), or any combination thereof; B is aluminum (Al), nickel (Ni), cobalt (Co), manganese (Mn), chromium (Cr), iron (Fe), magnesium (Mg), strontium (Sr), vanadium (V), a rare earth element, or any combination thereof; D is oxygen (O), fluorine (F), sulfur (S), phosphorus (P), or any combination thereof; E is cobalt (Co), manganese (Mn), or any combination thereof; F is fluorine (F), sulfur (S), phosphorus (P), or any combination thereof; G is aluminum (Al), chromium (Cr), manganese (Mn), iron (Fe), magnesium (Mg), lanthanum (La), cerium (Ce), strontium (Sr), vanadium (V), or any combination thereof; Q is titanium (Ti), molybdenum (Mo), manganese (Mn), or any combination thereof; I is chromium (Cr), vanadium (V), iron (Fe), scandium (Sc), yttrium (Y), or any combination thereof; and J is vanadium (V), chromium (Cr), manganese (Mn), cobalt (Co), nickel (Ni), copper (Cu), or any combination thereof.

The compounds listed above as positive active materials may have a surface coating layer. Additionally, a mixture of a compound without having a coating layer and a compound having a coating layer, the compounds being selected from the compounds listed above, may be used. The coating layer may include a compound of a coating element such as an oxide, a hydroxide, an oxyhydroxide, an oxycarbonate, and a hydroxycarbonate of the coating element. The coating layer compounds may be amorphous or crystalline. Non-limiting examples of the coating element contained in the coating layer include Mg, Al, Co, K, Na, Ca, Si, Ti, V, Sn, Ge, Ga, B, As, Zr, and any mixture thereof. A method of forming the coating layer may be any method commonly used for coating, non-limiting examples of which include a spray coating method, an immersion method, and the like, which do not (or substantially do not) adversely affect the physical properties of the positive active material when a compound of such a coating element is used.

For example, $LiNiO_2$, $LiCoO_2$, $LiMn_xO_{2x}$ (x=1, 2), $LiNi_{1-x}Mn_xO_2$ (0<x<1), $LiNi_{1-x-y}Co_xMn_yO_2$ (0≤x≤0.5 and 0≤y≤0.5), $LiFeO_2$, $V_2O_5$, TiS, MoS, and the like may be used.

The conductive agent, the binder, and the solvent used in the positive active material composition may be the same as or different from those of the negative active material composition as described above. A plasticizer may further be added to the positive active material composition and the negative active material composition to form pores inside the electrode plates. In this regard, the contents of the positive active material, the conductive material, the binder, and the solvent may be the same level as those suitable for use in lithium batteries.

The positive current collector may be any one of various current collectors that has a thickness, for example, of about 3 to about 500 µm, does not (or substantially does not) cause any undesired chemical change in the fabricated battery, and has high conductivity. Non-limiting examples include stainless steel, aluminum, nickel, titanium, calcined carbon, and aluminum or stainless steel that is surface-treated with carbon, nickel, titanium, silver, and the like. The current collector may have a surface on which fine irregularities are formed to enhance adhesive strength of the current collector to the positive active material. The current collector may be used in any of various forms, non-limiting examples of which include films, sheets, foils, nets, porous structures, foams, and non-woven fabrics.

In one embodiment, the prepared positive active material composition may directly be coated on the positive current collector and dried to prepare a positive electrode plate. In another embodiment, the positive active material composition may be cast on a separate support, and then a film separated from the support is laminated on the positive current collector to prepare the positive electrode plate.

The positive electrode and the negative electrode may be separated from each other by a separator. Any separator that is suitable for use in lithium batteries may be used. Particularly, a separator that has low resistance to migration of ions of an electrolyte and good electrolytic solution-retaining ability may be used. Non-limiting examples of the separator include glass fiber, polyester, Teflon, polyethylene, polypropylene, polytetrafluoroethylene (PTFE), and any combination thereof, each of which may be a nonwoven fabric or a woven fabric. The separator may have a pore diameter of about 0.01 to about 10 µm and a thickness of about 5 to about 300 µm.

A lithium salt-containing non-aqueous electrolyte may include a non-aqueous electrolyte solution and lithium. As the $Si_3Al_3Fe_2$ non-aqueous electrolyte, a non-aqueous electrolyte solution, an organic solid electrolyte, or an inorganic solid electrolyte may be used.

Non-limiting examples of the non-aqueous electrolyte solution include an aprotic organic solvent such as N-methyl-2-pyrrolidone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, acetonitrile, nitromethane, methyl formate, methyl acetate, phosphoric acid trimester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Non-limiting examples of the organic solid electrolyte include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Non-limiting examples of the inorganic solid electrolyte include a nitride, halide, or sulfate of Li such as $Li_3N$, LiI, $Li_5NI_2$, $Li_3N$—LiI—LiOH, $LiSiO_4$, $LiSiO_4$—LiI—LiOH, $LiSiS_3$, $Li_4SiO_4$, $Li_4SiO_4$—LiI—LiOH, and $Li_3PO_4$—$Li_2S$—$SiS_2$.

Any lithium salt suitable for use in lithium batteries may be used. The lithium salt is a material that is soluble in the non-aqueous electrolyte. Non-limiting examples include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborate lithium, lower aliphatic carboxylic acid lithium, lithium tetraphenyl borate, imide, and combinations thereof.

A lithium battery may be classified as being a lithium ion battery, a lithium ion polymer battery, or a lithium polymer battery according to the types of separator and electrolyte. In addition, a lithium battery may be classified by shape as being a cylindrical shape battery, a rectangular shape battery, a coin shape battery, or a pouch shape battery. Lithium batteries may be further classified by size as being a bulky battery or a thin film battery. Lithium batteries may be used either as lithium primary batteries or lithium secondary batteries.

Methods of manufacturing these batteries include any suitable methods of manufacturing such batteries.

FIG. 1 is a schematic view of a structure of a lithium battery 30 according to an embodiment.

Referring to FIG. 1, the lithium battery 30 includes a positive electrode 23, a negative electrode 22, and a separator 24 between the positive electrode 23 and the negative electrode 22. The positive electrode 23, the negative electrode 22, and the separator 24 are wound or folded, and then placed in a battery case 25. Then, an electrolyte is injected into the battery case 25 and the battery case 25 is sealed by a sealing member 26, thereby completing the manufacture of the lithium battery 30. The battery case 25 may have a cylindrical shape, a rectangular shape or a thin-film shape. The lithium battery may be a lithium ion battery.

The lithium battery may be suitable for use as power sources for electric vehicles and applications requiring high capacity, high-power output, and high temperature driving conditions, in addition to power sources for conventional mobile phones and portable computers, and may be coupled to conventional internal combustion engines, fuel cells, or super-capacitors to be used in hybrid vehicles. In addition, the lithium battery may be used in applications requiring high-power output, high voltage, and high temperature driving conditions.

One or more embodiments will be described in more detail with reference to the following examples. However, these examples do not limit the scope of the present invention.

Preparation of Negative Active Material and a Coin Cell Battery

Comparative Example 1

First, Si, Ti, and Ni were mixed at a ratio of 66 at %:17 at %:17 at %. The mixture was added to a vacuum induction melting furnace (Yein Tech., Korea) and melted in a vacuum in order to inhibit oxidation caused by the air exposure, thereby preparing a mother alloy.

The prepared mother alloy was cut into lumps and added to an injection-molding pipe of a melt spinner (Yein Tech., Korea). The mother alloy was then melted by high frequency induction heating in an argon (Ar) gas atmosphere, injection-molded to a ribbon shaped alloy by ejecting the melted mother alloy to a rotating Cu wheel through a nozzle, and rapidly solidified.

The prepared ribbon shaped alloy was pulverized using a ball mill to obtain Si alloy powder having an average particle diameter (D50) of about 3 μm to about 5 μm.

A coin cell was manufactured according to the following process using the prepared Si alloy powder as a negative active material.

A negative active material slurry was prepared by mixing the Si alloy powder as a negative active material, polyamideimide as a binder, and Ketjen Black and graphite as conductive agents at a weight ratio of 80:8:2:10, and adding N-methylpyrrolidone to the mixture to adjust viscosity of the mixture until a solid content thereof reached 60 wt %. The prepared slurry was coated on a copper foil current collector having a thickness of 10 μm to manufacture a negative electrode plate. The completely coated electrode plate was dried at the temperature of 110° C. for 15 minutes, followed by pressing, thereby completing the manufacture of a negative electrode having a density of 1.5 g/cc. The dried negative electrode plate was heat-treated in a vacuum at 350° C. for 1 hour, and the electrode plate was cut to a size of 16 mm to prepare a negative electrode to be applied to a coin cell. A counter electrode was prepared using Li metal, and a polyethylene separator (Celgard 3501) having a thickness of 20 μm was used. An electrolyte was injected thereto, and the resultant structure was pressed to complete the manufacture of a 2016R coin cell. In this case, the electrolyte was 1.10 M $LiPF_6$ dissolved in a mixed solvent of ethylene carbonate (EC), diethyl carbonate (DEC), and fluoroethylene carbonate (FEC), in which a volume ratio of EC:DEC:FEC is 3:3:4.

Comparative Example 2

A Si alloy powder and coin cell using in the same were prepared in the same manner as in the Comparative Example 1, except that Fe was further added to the alloy mixture, and the ratio of Si, Ti, Ni, and Fe to prepare the mother alloy was 65 at %:12 at %:12 at %:11 at %.

Example 1

A Si alloy powder and coin cell using in the same were prepared in the same manner as in the Comparative Example 1, except that Fe was further added to the alloy mixture, and the ratio of Si, Ti, Ni, and Fe to prepare the mother alloy was 69.5 at %:10.25 at %:10.25 at %:10 at %.

Example 2

A Si alloy powder and coin cell using in the same were prepared in the same manner as in the Comparative Example 1, except that Fe was further added to the alloy mixture, and the ratio of Si, Ti, Ni, and Fe to prepare the mother alloy was 69 at %:11 at %:11 at %:9 at %.

Example 3

A Si alloy powder and coin cell using in the same were prepared in the same manner as in the Comparative Example 1, except that Fe was further added to the alloy mixture, and the ratio of Si, Ti, Ni, and Fe to prepare the mother alloy was 69 at %:11.5 at %:11.5 at %:8 at Example 4

A Si alloy powder and coin cell using in the same were prepared in the same manner as in the Comparative Example 1, except that Fe was further added to the alloy mixture, and the ratio of Si, Ti, Ni, and Fe to prepare the mother alloy was 69 at %:12 at %:12 at %:7 at %.

Comparative Example 3

A Si alloy powder and coin cell using in the same were prepared in the same manner as in the Comparative Example 1, except that Fe was further added to the alloy mixture, and the ratio of Si, Ti, Ni, and Fe to prepare the mother alloy was 71 at %:11 at %:11 at %:7 at %.

Comparative Example 4

A Si alloy powder and coin cell using in the same were prepared in the same manner as in the Comparative Example 1, except that Fe was further added to the alloy mixture, and the ratio of Si, Ti, Ni, and Fe to prepare the mother alloy was 70 at %:12 at %:12 at %:6 at %.

Comparative Example 5

A Si alloy powder and coin cell using in the same were prepared in the same manner as in the Comparative Example 1, except that Fe was further added to the mixture, and the ratio of Si, Ti, Ni, and Fe to prepare the mother alloy was 72 at %:11 at %:11 at %:6 at %.

Evaluation Example 1

Phase Analysis of Si Alloy Powder

Results of phase analysis of the Si alloy powders prepared according to Comparative Examples 1 to 5 and Examples 1 to 4 with respect to composition ratios thereof are shown in Table 1 below.

to an extent that a ratio of Si that does not substantially react with Li may increases among the active silicon. Accordingly, discharge capacity and lifetime characteristics may be deteriorated. In this case, when the atomic fraction of Si is adjusted to be 70 at % or less, a desired content of the active silicon may be formed even when the atomic fraction of Fe is increased up to 7 at %.

Phase analysis results of the Si alloy powders prepared according to Comparative Example 1 and Examples 1 to 3 obtained using an X-ray diffractometer (X'Pert PRO MPD, PANalytical) are shown in FIGS. 2 through 5. Evaluation was performed using CuK-alpha X-rays having a wavelength of 1.541 Å.

As illustrated in FIGS. 2 to 5, only the $Si_7Ti_4Ni_4$ phase is formed in the Si alloy powder according to Comparative Example 1. 36.25 at % of Si, which is not used to form the ternary alloy is formed as the active phase.

On the other hand, in Examples 1 to 3, the $Si_2TiFe$ alloy phase, the $Ti_2Ni$ alloy phase, and the silicide of the $NiSi_2$ phase are formed as inactive phases. Although the $Ti_2Ni$ phase constitutes the inactive matrix in Example 1, the content thereof is too small. Thus, the $Ti_2Ni$ phase is not clearly identified in the XRD graph. When the content of Fe is less than that of Example 1, the $Ti_2Ni$ phase was clearly identified in the XRD graph. In this regard, since the silicide $NiSi_2$ phase and the active Si phase have peaks at the same position, it is difficult to accurately measure a ratio therebetween. However, a relative ratio between the active Si and the silicide $NiSi_2$ may be predicted by measuring discharge capacity of a cell.

TABLE 1

|  | Composition ratio | | | | Active Si | $Si_2TiFe$ | $Ti_2Ni$ | $NiSi_2$ |
| --- | --- | --- | --- | --- | --- | --- | --- | --- |
|  | Si | Ti | Ni | Fe | (at %) | (at %) | (at %) | (at %) |
| Comparative Example 1 | 66.0 | 17.0 | 17.0 | 0 | 36.25 | 63.75 | — | — |
| Comparative Example 2 | 65.0 | 12.0 | 12.0 | 11.0 | 20.0 | 44.0 | 1.5 | 34.5 |
| Example 1 | 69.5 | 10.25 | 10.25 | 10.0 | 29.5 | 40.0 | 0.375 | 30.375 |
| Example 2 | 69.0 | 11.0 | 11.0 | 9.0 | 31.0 | 36.0 | 3.0 | 30.0 |
| Example 3 | 69.0 | 11.5 | 11.5 | 8.0 | 33.5 | 32.0 | 5.25 | 29.25 |
| Example 5 | 69.0 | 12.0 | 12.0 | 7.0 | 36.0 | 28.0 | 7.5 | 28.5 |
| Comparative Example 3 | 71.0 | 11.0 | 11.0 | 7.0 | 39.0 | 28.0 | 6.0 | 27.0 |
| Comparative Example 4 | 70.0 | 12.0 | 12.0 | 6.0 | 40.0 | 24.0 | 9.0 | 27.0 |
| Comparative Example 5 | 72.0 | 11.0 | 11.0 | 6.0 | 43.0 | 24.0 | 7.5 | 25.5 |

As shown in Table 1, when the alloy is prepared using 66 at % of Si, 17 at % of Ti, and 17 at % of Ni according to Comparative Example 1, an inactive matrix having a $Si_7Ti_4Ni_4$ phase is formed of 29.75 at % of Si, 17 at % of Ti, and 17 at % of Ni, and the remaining 36.25 at % of Si is precipitated as active silicon capable of reacting with Li.

Meanwhile, Fe may further be added to prepare the Si alloy in addition to Ti and Ni. However, when the atomic fraction of Fe is greater than 10 at % as in Comparative Example 2, the amount of Si used in the formation of the $Si_2TiFe$ phase increases, and thus the content of the active silicon becomes relatively small. On the other hand, in Comparative Examples 3 to 5, when the atomic fraction of Fe is 7 at % or less, the content of the active silicon increases Evaluation Example 2

Charging-Discharging Test

The coin cells prepared in Comparative Example 1 and Examples 1 to 3 were subjected to a formation process at a rate of 0.1 C to form a stable protective layer (SEI layer) on the coin cells, and then one cycle of charging and discharging was performed at a rate of 0.2 C to measure capacity. Then, charging and discharging of the coin cells were repeatedly performed 100 times at a rate of 1.0 C. Then, cycle characteristics thereof were compared with each other.

First, the coin cells prepared according to Comparative Example 1 and Examples 1 to 3 were subjected to a formation process at a rate of 0.1 C. Then, one cycle of charging and discharging was performed at a rate of 0.2 C to measure discharge capacity. The measured discharge capacity and the atomic fraction are shown in Table 2 below.

TABLE 2

|  | Discharge capacity (mAh/g) | Increase of Capacity | Active Si (at %) |
| --- | --- | --- | --- |
| Comparative Example 1 | 695 | — | 36.25 |
| Example 1 | 799 | 15% | 29.25 |
| Example 2 | 802 | 15% | 31.00 |
| Example 3 | 855 | 23% | 33.50 |

Figure 6:
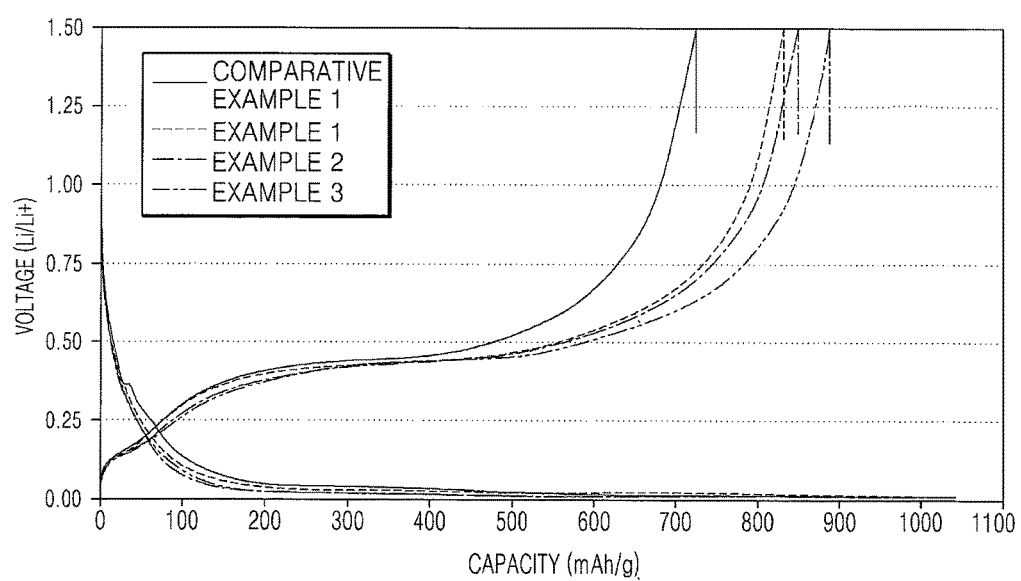
FIG. 6 is a graph illustrating initial charge and discharge curves of coin cells prepared according to Comparative Example 1 and Examples 1 to 3.

As shown in Table 2, although the contents of the active Si according to Examples 1 to 3 are less than that of the active Si according to Comparative Example 1, discharge capacity according to Example 1 to 3 are greater than that according to Comparative Example 1. This is because in Comparative Example 1, not all of the active Si is available to be used in reversible reaction with Li in the $Si_7Ti_4Ni_4$ phase, which is a ternary Si-based alloy, as described above. On the contrary, although the content of the active Si was smaller in the quaternary alloy of Si, Ti, Ni, and Fe in Examples 1 to 3, a larger amount of the active Si was involved in reversible reaction with Li. Thus, discharge capacity was increased in Examples 1 to 3. The increase in discharge capacity is illustrated in the initial charge and discharge curves of FIG. 6.

Figure 7:
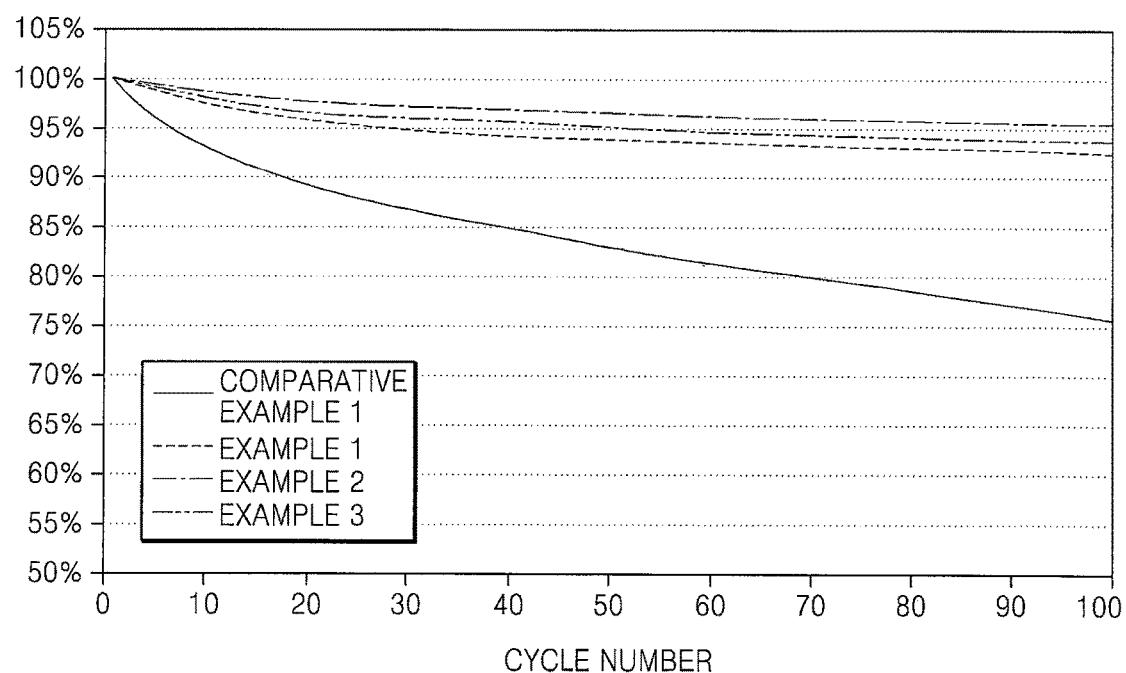
FIG. 7 is a graph illustrating charge retention ratios per cycle of coin cells prepared according to Comparative Example 1 and Examples 1 to 3.

In addition, during charging and discharging of the coin cells prepared in Comparative Example 1 and Examples 1 to 3, discharge capacity and capacity retention ratio of each cycle were measured. The results are shown in FIG. 7. The capacity retention ratio (CRR) is defined as Equation 1 below.

Capacity retention ratio [%]=[Discharge capacity at each cycle/Discharge capacity at $1^{st}$ cycle]×100     Equation 1

As illustrated in FIG. 7, the coin cells according to Examples 1 to 3 had greater discharge capacity and longer lifetime than that according to Comparative Example 1. Since the amount of Si among the active silicon involved in irreversible reaction with Li and the total amount of the active Si is small, lifetime deterioration caused by the irreversible reaction with Li decreases, thereby improving lifetime characteristics.

As described above, according to one or more of the above embodiments, the negative active material includes a silicon-based alloy including Si, Ti, Ni and Fe components, and thus may improve discharge capacity and lifetime characteristics of a lithium battery.

It should be understood that the exemplary embodiments described therein should be considered in a descriptive sense only and not for purposes of limitation. Descriptions of features or aspects within each embodiment should typically be considered as available for other similar features or aspects in other embodiments.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A negative active material comprising a silicon-based alloy comprising Si, Ti, Ni, and Fe components, wherein the silicon-based alloy comprises:
an inactive matrix comprising a $Ti_2Ni$ phase; and
active silicon nanoparticles dispersed in the inactive matrix.

2. The negative active material of claim 1, wherein an amount of the Fe component in the silicon-based alloy is about 7 at % to about 10 at % based on its atomic fraction in the silicon-based alloy.

3. The negative active material of claim 1, wherein the silicon-based alloy comprises about 50 at % to about 70 at % of the Si component, about 7 at % to about 10 at % of the Fe component, with the balance being equally split between an at % of Ti and an at % of Ni, based on each respective atomic fraction in the silicon-based alloy.

4. The negative active material of claim 1, wherein the inactive matrix further comprises a $Si_2TiFe$ phase and a $NiSi_2$ phase.

5. The negative active material of claim 1, wherein:
the Si component comprises inactive silicon and active silicon;
the inactive matrix comprises the inactive silicon; and
the active silicon nanoparticles comprise the active silicon.

6. The negative active material of claim 1, wherein the content of the active silicon nanoparticles in the silicon-based alloy is 36 at % or less based on its atomic fraction in the silicon-based alloy.

7. The negative active material of claim 6, wherein the content of the active silicon nanoparticles in the silicon-based alloy is greater than 20 at % and to 36 at % or less, based on its atomic fraction in the silicon-based alloy.

8. The negative active material of claim 1, wherein the active silicon nanoparticles have a particle diameter of about 10 nm to about 200 nm.

9. The negative active material of claim 1, wherein the silicon-based alloy has an average particle diameter (D50) of about 0.3 μm to about 10 μm.

10. A negative active material comprising a silicon-based alloy comprising Si, Ti, Ni, and Fe components, wherein the silicon-based alloy comprises:
an inactive matrix; and
active silicon nanoparticles dispersed in the inactive matrix,
wherein:
an amount of the active silicon nanoparticles in the silicon-based alloy is greater than 20 at % and to 36 at % or less, based on its atomic fraction in silicon-based alloy; and
an amount of the Fe component is about 7 at % to about 10 at % based on its atomic fraction in silicon-based alloy.

11. The negative active material of claim 10, wherein the silicon-based alloy comprises about 50 at % to about 70 at % of the Si component, about 7 at % to about 10 at % of the Fe component, with the balance being equally split between an at % of Ti and an at % of Ni, based on each respective atomic fraction in the silicon-based alloy.

12. The negative active material of claim 10, wherein the inactive matrix comprises a $Si_2TiFe$ phase, a $Ti_2Ni$ phase, and a $NiSi_2$ phase.

13. The negative active material of claim 10, wherein the active silicon nanoparticles have a particle diameter of about 10 nm to about 200 nm.

14. The negative active material of claim 10, wherein the silicon-based alloy has an average particle diameter (D50) of about 0.3 μm to about 10 μm.

15. A negative electrode comprising the negative active material of claim 1.

16. A lithium battery comprising the negative electrode of claim 15.

17. A method of manufacturing a negative active material, the method comprising:
preparing a mother alloy comprising about 50 at % to about 70 at % of Si, about 7 at % to about 10 at % of Fe, with the balance being equally split between the at % of Ti and the at % of Ni, based on a total of the atomic fractions of Si, Fe, Ti, and Ni at 100 at %, to prepare a silicon-based alloy;
rapidly solidifying melts of the mother alloy to obtain a rapidly solidified alloy; and
pulverizing the rapidly solidified alloy.

18. The method of claim 17, wherein the rapidly solidifying the melts of the mother alloy is performed by utilizing melt spinning, gas atomizing, or strip casting.

19. The method of claim 17, wherein the rapidly solidifying the melts of the mother alloy comprises quenching the melts of the mother alloy at a rate of about $10^3$ K/sec to about $10^7$ K/sec.

20. The method of claim 17, wherein the rapidly solidified alloy is pulverized into powder having a D50 of about 0.3 μm to about 10 μm.

* * * * *